United States Patent Office 3,661,918
Patented May 9, 1972

3,661,918
PROCESS FOR THE PREPARATION OF
BICYCLIC AMINES
Constantine J. Bouboulis, Union, N.J., assignor to Esso
Research and Engineering Company
No Drawing. Filed Oct. 17, 1968, Ser. No. 768,540
Int. Cl. C07d 39/00
U.S. Cl. 260—293.52                                  11 Claims

ABSTRACT OF THE DISCLOSURE

Substituted bicyclic amine compounds such as substituted 1-aza bicyclo[3,3,1]nonanes are synthesized through the catalytically promoted hydrogenation of triamino compounds, ketodiamino compounds, trinitrile compounds and keto-dinitrile compounds. The starting trinitrile and keto-dinitrile compounds are desirably produced by cyanoethylating either a ketone or a mononitrile compound. The triamino and keto-diamino materials are obtained by hydrogenation of the nitrile compounds. The substituted bicyclic amine compositions are useful as agricultural chemicals and as additives or additive precursors for hydrocarbon compositions ranging from gasoline fractions through middle distillate fuels and lubricating oils.

BACKGROUND OF THE INVENTION

(I) Field of the invention

This invention pertains to substituted 1-aza bicyclo nonane compounds, a process for their formation, and the pyridine and piperidine precursors of said bicyclo nonane compounds. In particular, the invention relates to the formation of 1-aza bicyclo[3,3,1]nonanes, the process for the formation of the 1-aza bicyclo nonanes, and the pyridine and piperidine precursors of the bicyclo nonane materials.

(II) Description of the prior art

It has been reported in Belgian patent 668,372 and by Takata et al. in Nippon Kakaku Zaashi (85), (3), 237–8 (1964) that cyanoethylated ketones and pimelonitrile compounds can be hydrogenated to form 3(alkylamino) tetrahydropyridine and 3(alkylamine)piperidine compounds. The prior art workers did not report securing bicyclic compounds with their reaction systems.

SUMMARY OF THE INVENTION

In accordance with the present invention, it has been discovered that substituted 1-aza bicyclo nonane compounds, substituted 3(alkylamino)piperidine compounds and substituted 3(alkylamino)tetrahydropyridine compounds can be readily synthesized by hydrogenating keto-diamino compound or a keto-dinitrile compound. Hydrogenation of a trinitrile organic compound or a triamino compound yields a substituted 1-aza bicyclo nonane compound. The hydrogenation operation is conducted employing conventional hydrogenation catalysts at moderate to rigorous temperature and hydrogen pressure conditions. The tertiary nitrogen bearing bicyclic nonanes and the primary, secondary nad primary, tertiary nitrogen containing piperidine and tetrahydropyridine compounds (precursors to the bicyclic nonane materials) thereby produced have many uses and in particular find utility as agricultural chemical intermediates and as additives or for the synthesis of additives for hydrocarbon fractions. The 1-aza bicyclic nonane compounds can be subsequently reacted with an acid, an alkyl halide to form quaternary ammonium salts or an epoxide to give quaternary choline type bases.

With the present invention, keto-dinitriles, trinitrile keto-diamino, or triamino compositions are catalytically hydrogenated in the presence of a solvent to secure substituted primary, secondary or primary, tertiary monocyclic diamines (aminopiperidines and aminotetrahydropyridines) and tertiary bicyclic amines (bicyclo nonane compounds). The monocyclic diamine compounds are precursors of the bicyclic compounds. The overall reactions contemplated by the instant invention are set forth below:

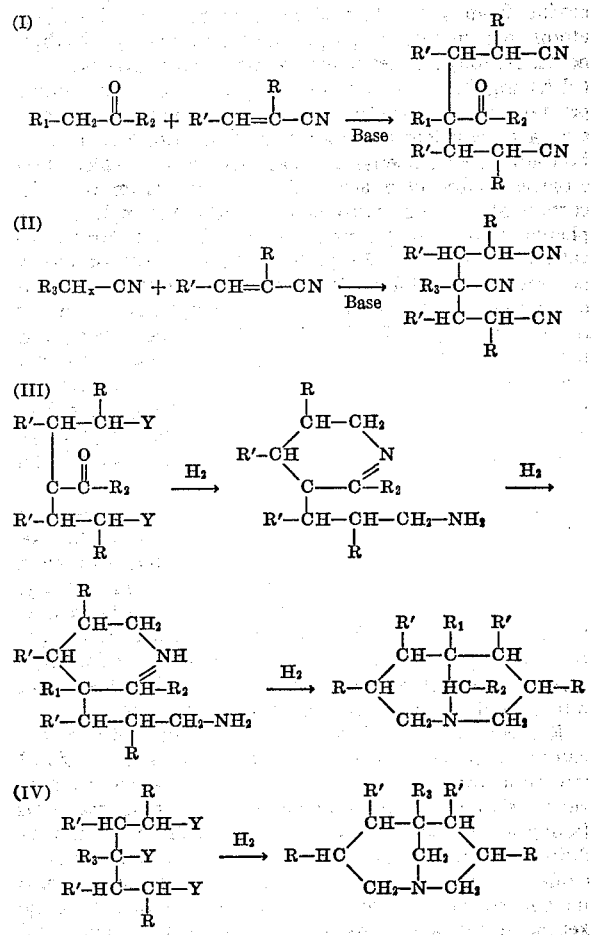

In Equation I is shown the reaction of a ketone compound with an acrylonitrile based material in order to secure a ketodinitrile compound. In Equation II is shown the cyanoethylation of a mononitrile compound to secure an organotrinitrile material. The reactions illustrated by Equations I and II are described in more detail in "Organic Reactions" Volume V, John Wiley & Sons, Inc. (1952), pp. 79–135. The corresponding keto-diamino and triamino compositions are secured by hydrogenating the nitriles. Equation III illustrates the hydrogenation of a model compound such as the keto-dinitrile formed pursuant to Equation I to a substituted bicyclononane material. Intermediate to the formation of the bicyclononane compound are first of all a substituted alkylamino tetrahydropyridine compound and secondly a substituted alkylaminopiperidine compound. Lastly, in Equation IV is shown the hydrogenation of a model compound such as the trinitrile compound formed pursuant to Equation II to a substituted 1-aza bicyclononane compound. In Equations III and IV, "Y" designates either a nitrile (—CN) radical or a methyl amino (—CH$_2$NH$_2$) radical.

The mononitrile compounds utilized in Equations I and II to form either the trinitrile compounds or the keto-dinitrile compounds may be acrylonitrile, crotonitrile or methacrylonitrile. Hence, R and R' may both be hydrogen atoms or one hydrogen atom and one methyl radical. The reaction does not proceed in a favorable manner if both R and R' are methyl radicals.

Many differing kinds of organic monoketone compounds can be employed as the starting material for the production of the keto-dinitrile compounds (which can be converted to keto-amino compounds). In general, $R_1$ may be a monovalent organic radical having from 1 to 20, preferably from 1 to 15 carbon atoms per radical. More particularly, $R_1$ may be a monovalent alkyl radical having from 1 to 15, preferably from 1 to 12 carbon atoms, e.g. methyl, isopropyl, hexyl, cyclohexyl, 2-ethylhexyl, isononyl, dodecyl, etc.; a monovalent alkenyl radical having from 2 to 20 preferably 2 to 12 carbon atoms per radical, e.g., ethylene, isopropenyl, pentenyl, octenyl, etc.; a monovalent aryl radical having from 6 to 12 carbon atoms, e.g., phenyl and naphthyl; a monovalent heterogroup substituted aryl radical having from 6 to 15 carbon atoms, e.g. nitrophenyl, methoxyphenyl, cyanophenyl, nitronaphthyl, etc.; a monovalent alkylaryl radical having from 7 to 25, preferably 7 to 18 carbon atoms per radical, e.g. tolyl, ethylphenyl, diisobutylphenyl, triethylnaphthyl, etc.; a monovalent aralkyl radical having from 7 to 25, preferably 7 to 18 carbon atoms, e.g. benzyl, 3-phenylpropyl, 4-phenyloctyl, 3-naphthylethyl, 3,4-diphenylpentyl, etc.; and monovalent ether radicals, in particular monovalent ether radicals having from 2 to 20, preferably 2 to 15 carbon atoms, e.g. phenoxymethyl, 3-phenoxypropyl, 2-oxapropyl, 3-oxabutyl, 3-oxadodecyl, 2-oxa-4-methylpentyl.

The value of $R_2$ can also vary over a wide range. For example, $R_2$ can be an aryl radical, or alkyl or heterogroup substituted aryl radical having from 6 to 25 carbon atoms. Useful aryl radicals include phenyl and naphthyl radicals. Useful alkylaryl radicals are compositions having from 7 to 25, preferably 7 to 16 carbon atoms per radical, e.g. methylphenyl, diethylphenyl, diisobutylphenyl, trimethylphenyl, nonylphenyl, triethylnaphthyl, nitrophenyl, methoxyphenyl, cyanophenyl, etc.

Representative non-limiting examples of useful monoketone compounds that fall within the above defined structural formulas as well as compounds which are converted during the cyanoethylation reaction to materials falling within the above structural formula under the conditions of the cyanoethylation reaction include: mesityl oxide, isomesityl oxide, methyl ethyl ketone, benzyl methyl ketone, benzyl phenyl ketone, benzyl naphthyl ketone, hexylphenyl ethyl ketone, isobutenyl propylphenyl ketone, octyl phenyl ketone, 4-phenylnonyl methyl ketone, p - nitrophenylacetone, p - cyanophenylacetone, m-methoxybenzylphenyl ketone, 2-oxo-5-oxahexane, etc.

Many different varieties of organic mononitrile compounds can be employed as per Equation II to secure trinitrile compounds (which can be converted to the subject amino radical containing compounds). As noted in Equation II useful mononitrile materials have the general formula $R_3CH_x$—CN. $R_3$ is a monovalent or divalent organic radical having from 2 to 25, preferably 2 to 18 carbon atoms and $x$ is 1 or 2. $R_3$ is preferably an aryl radical, an alkylaryl radical, a heterogroup substituted aryl radical, an ethylidene radical ($CH_3$—CH=) or a substituted ethylidene radical. Typical aryl radicals include phenyl and naphthyl radicals. Suitable alkylaryl radicals have from 7 to 25, preferably 7 to 18 carbon atoms per radical, e.g. ethylphenyl, tolyl, tributylphenyl, octylphenyl, dodecylphenyl, dipropylnaphthyl, etc. Useful substituted aryl compositions include cyanophenyl, nitrophenyl, hydroxyphenyl, methoxyphenyl, etc. Typical ethylidene and substituted ethylidene radicals include β-phenylethylidene, α-methylethylidene, β-(p-cyanophenyl)ethylidene, β - (o - methoxyphenyl)ethylidene, β-(p-nitrophenyl)ethylidene, etc. During the course of a reaction (Equation II) the ethylidene or substituted ethylidene radicals of the organic mononitrile compound undergo a hydrogen shift such that alpha, alpha-disubstituted nitriles are formed. This type of transformation is illustrated below using crotonitrile as an example.

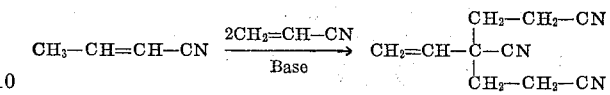

Representative, non-limiting examples of useful mononitrile compounds include benzyl nitrile, 3-ethylbenzyl nitrile, 4-isopropylbenzyl nitrile, 3-hydroxybenzyl nitrile, p-nitrobenzyl cyanide, 3-propyl-4-methylbenzyl nitrile, 2-nonylbenzyl nitrile, p - cyanobenzylnitrile, crotonitrile, naphthylacetonitrile, β-methylcrotonitrile, p-phenoxybenzylnitrile, γ-phenylcrotonitrile, γ-(o-methoxyphenyl)crotonitrile, and γ-(p-nitrophenyl)crotonitrile.

It is desirable that the hydrogenation reactions be conducted in the presence of a solvent. Useful solvents include $C_5$–$C_{20}$, preferably $C_5$–$C_8$, straight chain, branched chain or cyclic chain aliphatic hydrocarbons, e.g., hexane, isooctane, dodecane, cyclohexane, cyclooctane, etc.; $C_6$–$C_{20}$, preferably $C_6$–$C_{12}$ aryl and alkylaryl hydrocarbons, e.g., benzene, toluene, xylene, diethylbenzene, etc.; $C_3$–$C_{20}$, preferably $C_3$–$C_{10}$ lower aliphatic ethers, e.g., methylethyl ether, diethyl ether, tetrahydrofuran, isopropyl ether, dioxane, etc.; and $C_4$–$C_8$ tertiary monoalcohols, e.g. t-butyl alcohol, t-amyl alcohol, 1-methyl-1-ethylbutyl alcohol, etc. Most preferably, ethers and tertiary alcohols are used as the hydrogenation reaction solvents. Normally, one to two parts by weight of solvent is used per part by weight of process reactants. However, up to five parts of solvent per part by weight of reactant can be employed. Even larger quantities of solvent may be used; however, no advantage accrues when employing excess quantities of solvent.

Conventional hydrogenation catalysts are employed in the practice of the instant invention. Useful materials include platinum group metals and metal oxides as well as Raney nickel and Raney cobalt. Representative examples of useful catalyst materials include supported or unsupported nickel, cobalt, rhodium, ruthenium and palladium, Raney cobalt and Raney nickel. Nickel is the preferred catalyst as it leads to high selectivities to the desired bicyclic amine compounds. Platinum and platinum oxide may be employed as the hydrogenation catalyst; however, they have a tendency to be posioned by the intermediate products formed during the hydrogenation reaction. Preferred Raney nickel catalysts have surfaces areas varying from 1 to 20 square meters per gram of catalyst. Generally, from 0.5 to 30 wt. percent of catalyst, based upon starting reagent, is employed in the reaction. Amounts of catalyst in excess of about 30 wt. percent can be used but to no apparent advantage. If desired, the hydrogenation reaction can be conducted employing fixed bed catalyst techniques. In this event, the weight ratio of catalyst to reactants within the bed would be extremely high but still clearly within the purview of the instant invention.

In general, the monocyclic and bicyclic amine compounds of the present invention can be prepared utilizing either a one-stage or two-stage hydrogenation operation. In a one-stage operation wherein the predominant product (greater than 50 mole percent) is the bicyclic nonane compound, hydrogen pressures may vary between about 200 and 5000 p.s.i.g., preferably between 500 to 3500 p.s.i.g. and temperatures may range from −10 to 260° C., preferably 25 to 250° C. In a one-step operation, it is desirable that the reaction temperature be increased incrementally from about 25 to about 250° C. over the course of the reaction period. At the above described conditions of temperature and pressure, the reaction is substantially completed to the desired 1-aza-bicyclic nonane in from 7 to 20 hours.

In the two-stage operation i.e. heating at elevated temperatures in a stepwise manner, the starting compound is contacted with excess hydrogen at hydrogen pressures varying from about 200 to 5000 p.s.i.g., preferably between 800 and 3500 p.s.i.g., at temperatures varying from about 25 to 250° C., preferably 100 to 130° C. for a time until hydrogen uptake is substantially completed. This period can vary from about 2 to 12 hours. Thereafter, in the second portion of the operation, the reaction temperature is increased to a level between about 160 and 260° C., preferably between 200 and 250° C. and hydrogenation conducted at hydrogen pressures varying between 100 and 4000 p.s.i.g., preferably between 500 and 2500 p.s.i.g. This second portion of the two-stage operation is conducted for a period varying from about 4 to 10 hours. The protracted reaction times are necessary in certain cases to secure substantial yields of product, although it should be recognized that some product is formed instantaneously upon contact of the hydrogen with the starting reagents.

In the above-described two-stage operation, the predominant reaction product (molar basis) is the bicyclic amine product; however, minor amounts of the 3-(alkylamino)tetrahydropyridine and 3-(alkylamino) substituted piperidine products are formed. The reaction product is composed perdominantly (greater than 50 mole percent) of bicyclic material when protracted reaction periods (in excess of about 7 hours) are used and/or when elevated hydrogenation temperatures (greater than about 200° C.) are employed. At these conditions the product will more normally contain from 70 to 90 mole percent of the bicyclic amines.

When the piperidine and pyridine materials are the desired predominant products, milder conditions and preferably cobalt catalysts are employed. Hence, in the case of a one-stage system, temperatures ranging from about 25 to 220° C. should be employed. Similarly, in a two-stage system, the second step temperatures should be maintained between about 160 and 220° C. Hydrogen pressures substantially identical to those employed in the formation of the 1-aza-bicyclic nonane materials can be used. In general, the tetrahydropyridine and piperidine products are formed in a shorter period of reaction time than is the case with the 1-aza-bicyclo nonane compound.

The monocyclic piperidine and tetrahydropyridine compounds and 1-aza-bicyclic nonane compounds of this invention may generally be employed as oil additives in concentrations ranging from about 0.005 to about 10, preferably about 0.001 to 5 wt. percent, (based on weight of hydrocarbon) in hydrocarbon compositions ranging from gasoline fractions through middle distillate fuels and lubricating oils. The tetrahydropyridine and piperidine compounds may also be used as starting materials for the synthesis of oil or fuel additives.

The bicyclononane compounds of this invention, the substituted 3(3-alkylamino)piperidines and 3(alkylamino) tetrahydropyridines that are also formed during the synthesis of the bicyclononane compounds all possess utility as agricultural chemicals. Principally, these compounds serve as the starting materials for products that possess agricultural activity; however, the unmodified compounds also have some applicability in the agricultural area. For example, substituted bicyclononane compounds, because of their strong basicity, are effective defoliants. In addition, 2-methyl-3-isopropenyl-3(gamma-propylamine)-3,4,5,6-tetrahydropyridine, a precursor of the bicyclic compounds, is an effective housefly insecticide. For the most part, however, derivatives of the bicyclononane materials and the substituted piperidine and tetrahydropyridine compound find the greatest utility for agricultural purposes. Particularly effective materials are the quaternary ammonium salts of the bicyclononane compounds and addition products of the monocyclic tetrahydropyridine or piperidine materials.

Particularly effective agricultural materials are the reaction products of 2-methyl-3-isopropenyl-3(gamma-propylamino)-3,4,5,6-tetrahydropyridine with at least 2 moles of a substituted or unsubstituted lower alkylene oxide, e.g. ethylene oxide, propylene oxide, 3-methoxypropylene oxide, etc. For example, 2-methyl, -3-isopropenyl - 3[gamma-propylamino-N,N-di(3 - propylenephenoxy-2-hydroxy)]-3,4,5,6-tetrahydropyridine, the reaction product of 2 moles of phenoxy propylene oxide with 2-methyl-3-isopropenyl-3-(gamma-propylamino) - 3,4,5,6-tetrahydropyridine (MIPT) possesses fungicidal activity against bean rust and insecticidal activity against house flies and mite systemic. 2-methyl-3-isopropenyl-3[gamma-propylamino-N,N-di(1 - propylene-2-hydroxy)] - 3,4,5,6-tetrahydropyridine, formed by the reaction of MIPT with 2 moles of propylene oxide, has been found to be an effective fungicide against bean mildew.

As noted earlier, the quaternary ammonium salts of the instant bicyclic amine compounds are also effective as agricultural chemicals. The salts are formed by reacting an alkyl halide with the bicyclic amine compounds. Quaternary ammonium bases are prepared by reacting the quaternary ammonium salt with a base such as a metal hydroxide. The quaternary ammonium bases may also be synthesized by reacting the bicyclic amine compound with an alpha-epoxide followed by contact with a mole of water.

Various organic halides such as, for example, bischloromethyl durene methylbromide, methyl iodide, dodecyl iodide, methyl chloride, ethylene chlorohydrin, ethyl bromide and benzyl bromide may be employed in the synthesis of the quaternary ammonium salts. The metal oxides and hydroxides which can be used to form quaternary ammonium bases from the subject quaternary ammonium salts include the oxides and hydroxides of the metals of Groups I–A, I–B, II–A and II–B of the Periodic Chart of the Elements such as set forth on pages 394 and 395 of the Handbook of Chemistry and Physics, 38th edition. Useful metal oxides and hydroxides include sodium oxides, calcium hydroxides, potassium hydroxides, sodium hydroxide, silver oxide, silver hydroxide, etc. Organic 1,2-epoxides that are employed in the alternate synthesis of the quaternary ammonium salt bases may have from 2 to 20 carbon atoms. Examples of such epoxides are ethylene oxide, propylene oxide, and 1,2-epoxy butane. Particularly useful materials include compositions having the general formula:

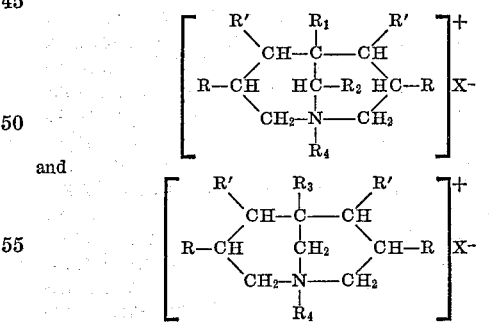

and wherein R, R', $R_1$, $R_2$ and $R_3$ are as previously defined. It is preferred that $R_4$ be either a hydrogen radical or a hydrocarbon or substituted hydrocarbon radical having from 1 to 30 carbon atoms. Preferably, $R_4$ is a straight chain, branched chain or cyclic monovalent alkyl or hydroxy alkyl radical; an aralkyl radical; or a bis-(alkylene) aryl radical. Typical, X is an organic or inorganic anion such as fluoride, bromide, iodide, chloride, cyanide, sulfate, sulfite, or hydroxyl. The quaternary ammonium hydroxides are effective soluble catalysts for organic systems requiring the use of strong bases. In these systems, most inorgnic bases are insoluble or only slightly soluble.

DESCRIPTION OF THE PREFERRED
EMBODIMENTS

The following embodiments are submitted in order to more particularly point out the invention but are not to be construed as a limitation upon the scope of the invention as set forth in the appended claims.

Example 1

Into a three-liter round bottom flask equipped with a mechanical stirrer, thermometer and an addition funnel were introduced 262 grams (2.76 moles) of mesityl oxide, 267 mililiters of t-butyl alcohol, 267 milliliters of isopropyl ether and 19 milliliters of a commercial 50% methanolic solution of a choline base $$([HOCH_2CH_2N^+(CH_3)_3]OH^-)$$

In the addition funnel was placed a mixture of 299 grams (5.34 moles) of acrylonitrile, 133 milliliters of t-butyl alcohol and 133 milliliters of isopropyl ether. The acrylonitrile solution was introduced to the flask under continuous stirring. During acrylonitrile addition, the reaction mixture was maintained at a temperature ranging from 5 to 7° C. with the aid of a Dry Ice-isopropyl alcohol cooling bath. The addition was carried out for a period of 1.5 hours during which time the solid dinitrile product precipitated forming a cream-colored slurry. Stirring and cooling was continued for an additional 1.5 hours. Thereafter 270 milliliters of water were added and stirring continued for an additional 0.25 hour at 15° C. The slurry was then filtered, the solids washed once with 600 milliliters of water and reslurried with 600 milliliters of water at 45–50° C. This final slurry was then filtered and the solids air dried resulting in 452 grams (83 mole percent yield) of gamma-acetyl-gamma-isopropenyl pimelonitrile. The product exhibited a melting point of 108° C.

Into a three-liter stainless steel rocking autoclave were then placed 200 grams (0.98 mole) of the previously formed keto-dinitrile along with 500 milliliters of t-butyl alcohol and 20 grams of Raney nickel catalyst. The catalyst was washed with isopropyl alcohol prior to introduction into the reactor. The air contained in the autoclave was then purged by introducing nitrogen. Later, the nitrogen was removed from the system by flushing the autoclave with hydrogen and thereafter the reactor was pressurized with hydrogen to 1800 p.s.i. Rocking of the autoclave was commenced and the temperature of the autoclave raised from about 20° C. to 120° C. in about 0.5 hour during which period the absorption of hydrogen began. The autoclave was maintained at 120° C. and rocking continued for four hours. Thereafter the bomb temperature was raised from 120° to 230° C. in about 45 minutes and maintained at this level for 5 hours. Hydrogen pressure throughout the reaction period ranged between 1400 and 2000 p.s.i. Upon completion of the 5 hour heating period, the autoclave was permitted to cool to room temperature. Thereafter, the contents of the autoclave were filtered to remove the catalyst and the filtrate fractionated at a reduced pressure. After removal of solvent, 133 grams (75 mole percent yield) of 1-aza-5-isopropyl-9-methyl bicyclo[3,3,1]nonane was secured. The material exhibited a boiling point of 67° C. at 0.3 millimeter of mercury pressure and a $pK_b$ of 2.7.

The product recovered was subjected to a carbon hydrogen and nitrogen analysis and was found to contain 79.83 wt. percent carbon, 12.72 wt. percent hydrogen and 7.53 wt. percent nitrogen. The actual bicyclononane product thought to have been formed would contain 79.49 wt. percent carbon, 12.78 wt. percent hydrogen and 7.72 wt. percent nitrogen. The infra-red spectrum of the product indicated the absence of amine hydrogens and the NMR spectrum revealed doublets at 0.72 and 0.78 p.p.m., which indicates the C–5-isopropyl group and a doublet at 1.1 p.p.m. representing the C–9-methyl group. A multiplet at 2.9 p.p.m. is in accordance with the presence of the hydrogens located alpha to the nitrogen atom. On the basis of this experimental evidence, the following structure was assigned to the amine.

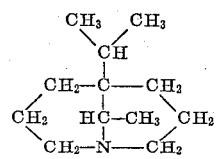

The bicyclononane product was found to be only slightly soluble in water but soluble in aliphatic and aromatic hydrocarbons, ketones, alcohols, chlorinated solvents and ethers.

Example 2

One hundred and twenty grams of the keto-dinitrile prepared in Example 1 were admixed with 400 milliliters (ml.) of absolute ethanol and 10 grams (g.) of Raney cobalt catalyst. The total mixture was then treated for 2 hours at 120° C. in an autoclave under a hydrogen pressure varying between 2000 and 2500 p.s.i. After the initial heating period, the temperature of the autoclave was raised to 160° C. and maintained at this level for an additional 2 hours.

The partially hydrogenated product was separated from the ethanol by distillation and was then mixed with 70 ml. of para-dioxane. This solution was mixed with 10 g. of Raney nickel and the total mixture hydrogenated at 220° C. to a hydrogen pressure varying from about 800 to 1500 p.s.i. After 5 hours at elevated temperature, a bicyclononane product identical to that secured pursuant to the procedure of Example 1 was separated from the dioxane at a yield of 52 mole percent.

Example 3

Into a 3-liter stainless steel autoclave were placed 200 grams (g.) of the dicyanoethylated mesityl oxide of Example 1, 500 milliliters (ml.) of t-butyl alcohol and 40 g. of isopropanol washed Raney cobalt catalyst. The autoclave was flushed with nitrogen and then with hydrogen and was then pressurized to 1800 p.s.i. with hydrogen. Rocking of the autoclave was commenced and the autoclave heated from room temperature to 120° C. and maintained at 120° C. for 2 hours. Thereafter, the temperature was raised to 180° C. and maintained at this level for 2 additional hours. The pressure throughout the reaction period varied between 1600 and 2200 p.s.i. Distillation of the reaction mixture resulted in securing 140 g. (74 moles percent yield) of 2-methyl-3-isopropenyl-3(3-propylamino)-3,4,5,6-tetrahydropyridine. The product exhibited a boiling point of 85° C. at 0.3 millimeter of mercury pressure. The product was found to contain 74.15 wt. percent carbon, 11.48 wt. percent hydrogen and 14.22 wt. percent nitrogen. The tetrahydropyridine compound thought to have been secured would contain 74.17 wt. percent carbon, 11.4 wt. percent hydrogen and 14.41 wt. percent nitrogen. The diamine was found to be soluble in water, alcohols, aliphatic and aromatic hydrocarbons and halogenated solvents.

Example 4

Two hundred grams (g.) of the dicyanoethylated mesityl oxide of Example 1 were mixed with 500 milliliters (ml.) of tertiary butyl alcohol and were hydrogenated in a 3-liter stainless steel autoclave in the presence of 40 g. of Raney cobalt catalyst. The hydrogen pressure range between 1500 and 2300 p.s.i. during the course of the reaction. For the first 2 hours of the reaction period, the autoclave was maintained at a temperature of 120° C. After this preliminary operation, (during which the keto-dinitrile was converted to a keto-diamino compound) the temperature of the autoclave was maintained at a level of 200° C. for an additional 5 hours. The product recovered after filtration of the catalyst was distilled producing 133.5 g. of 2-methyl-3-isopropenyl-3(3-propylamino)piperidine. This compound exhibited a boiling point of 82° C. at 0.25 millimeter of mercury pressure.

The diamine product was soluble in water, aromatic and aliphatic hydrocarbons, alcohols and halogenated solvents.

Example 5

Two hundred and fifteen grams (g.) of acrylonitrile (4.04 moles) was mixed with 50 milliliters (ml.) of t-butyl alcohol and 50 ml. of isopropyl ether and introduced dropwise with constant stirring to a mixture of 145 g. (2.01 mole) of 2-butanone, 200 ml. of t-butyl alcohol, 200 ml. of isopropylether and 3 ml. of a 30% methanoic solution of potassium hydroxide. The temperature throughout the addition which was conducted over a 2-hour period, was maintained between 5–7° C. The slurry resulting from the reaction was stirred for an additional 2 hours after which time 200 ml. of water were added. The solid gamma-acetyl-gamma-methyl pimelonitrile was filtered, washed twice with 200 ml. of water and air dried. Approximately 329 g. of the keto-dinitrile (92 mole percent yield) was recovered. The material exhibited a melting point of 65° C.

A solution of 200 g. of the previously prepared keto-dinitrile contained in 500 ml. of tetrahydrofuran was introduct into a 3-liter stainless steel autoclave together with 15 g. of Raney cobalt catalyst. The autoclave was first flushed with nitrogen followed by a flushing with hydrogen and was finally pressurized to 2500 p.s.i. with hydrogen. The autoclave was raised to a temperature of 120° C. and was maintained at this level for 8 hours during which period the hydrogen pressure within the autoclave ranged from a maximum of 3200 p.s.i. to a minimum of 2200 p.s.i. Following the reaction period, the autoclave was cooled to room temperature and 20 g. of supported nickel catalyst were carefully introduced into the reaction mixture. The autoclave was repressurized with 1000 p.s.i. of hydrogen, heated to 230° and maintained at this level for 10 hours. Reaction pressures varied between 1000 and 2000 p.s.i. Distillation of the resulting product gave 139.8 g. (81.5 mole percent yield) of 1-aza-5,9-dimethylbicyclo[3,3,1]nonane. This product exhibited a boiling point of 80° C. at 8 millimeters of mercury pressure and a melting point of 21° C. The product was found to contain 78.52 wt. percent carbon, 12.73 wt. percent hydrogen, and 9.3 wt. percent nitrogen. The product thought to have been secured would contain 78.37 wt. percent carbon, 12.49 wt. percent hydrogen and 9.14 wt. percent nitrogen.

The infra-red spectrum of the product indicated the absence of amine hydrogens and the NMR spectrum showed a singlet at 0.65 p.p.m. representing the $C_5$ methyl group. The spectrum further showed a doublet at 1.1 p.p.m. indicative of the C–9 methyl group and a multiplet at 3.0 p.p.m. which corresponds to the hydrogens located alpha to the nitrogen atom. The $pK_b$ of the amine was found to be 2.7 and the neutralization equivalent 152.5 (theory 153.2). On the basis of the experimental data, the following structure was assigned to the amine.

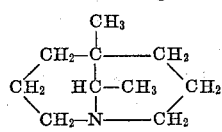

The bicyclic amine is partially soluble in water but completely soluble in aliphatic and aromatic hydrocarbons as well as alcohols, ketones, ethers and chlorinated hydrocarbons.

Example 6

A solution of 200 grams (g.) of gamma-acetyl-gamma-methylpimelo-nitrile in 500 milliliters (ml.) of p-dioxane and 20 g. of Raney cobalt catalyst were introduced into a 3-liter high pressure stainless steel autoclave. The air in the autoclave was replaced with hydrogen and the bomb pressurized to 2500 p.s.i.g. in the manner described in Example 1. Thereafter, the autoclave was heated with rocking for four hours at 100° C. After the initial 4 hours reaction period the bomb was heated to a temperature of 180 °C. and maintained at this level for 6 hours. The pressure during the 10 hour reaction time ranged from 3200 to 2400 p.s.i. Distillation of the reaction mixture resulted in recovery of 144 g. (75 mole percent yield) of 2,3-dimethyl-3(3-propylamindo)piperidine. The material had a boiling point of 60° C. at 0.2 mm. of mercury pressure and a neutralization equivalent of 85 (theory 85.1).

Example 7

Two hundred grams (g.) (0.99 mole) of gamma-cyano-gamma-phenylpimelo-nitrile (prepared according to the method described by Brunson and Riener, J. Am. Chem. Soc., 65, 23 (1943)) was introduced into a three-liter stainless steel autoclave together with 500 milliliters (ml.) of p-dioxane, 15 g. of Raney cobalt and 10 g. of Raney nickel catalyst. The autoclave was pressurized as described in Example 1 with 2200 p.s.i. of hydrogen and was thereafter heated at 120° C. for 2 hours. Thereafter the temperature of the autoclave was raised to 240° C. and was maintained there for 14 hours. Following completion of the reaction, the autoclave was cooled to room temperature, carefully depressurized and the reactor contents filtered and distilled. A product consisting of 126.5 g. (76 mole percent yield) of 1-aza-5-phenylbicyclo[3,3,1]-nonane was collected. The product had a melting point of 65–67° C. and a neutralization equivalent of 199.5 (theory 201.2). The product was found to contain 83.84 wt. percent carbon, 9.63 wt. percent hydrogen and 6.91 wt. percent nitrogen. The product thought to have been percent would contain 83.53 wt. percent carbon, 9.51 wt. percent hydrogen nad 6.96 wt. percent nitrogen. Infra-red and NMR spectrum analysis indicated the following structure.

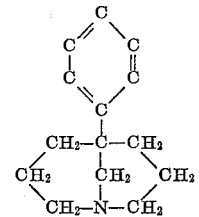

The bicyclic amine is insoluble in water but soluble in aliphatic and aromatic hydrocarbons, ketones, alcohols and chlorinated solvents.

Example 8

One hundred and ninety-two grams (g.) of gamma-acetyl-gamma-phenyl-pimelonitrile (synthesized by the method of Brunson and Riener (J. Am. Chem. Soc., 64, 2850 (1942)) was charged to a 3-liter stainless steel autoclave with 500 milliliters (ml.) of p-dioxane and 15 g. of Raney cobalt catalyst. The autoclave after purging was pressurized with 1800 pounds of hydrogen and heated at 120° C. for 8 hours. Thereafter, the autoclave was cooled to room temperature, carefully depressurized and 15 g. of Raney nickel was introduced. The autoclave was again repressurized with 1000 p.s.i.g. of nitrogen and the temperature raised to 230° C. and maintained at this level for an additional 10 hours. Throughout the reaction the hydrogen pressure ranged between 1600 and 2300 p.s.i. Distillation of the reaction product produced 151 g. (88 mole percent yield) of 1-aza-5-phenyl-9-methylbicyclo-[3,3,1]nonane. This product was found to have a melting point of 105° C. and was also found to contain 83.59 wt. percent carbon, 9.89 wt. percent hydrogen and 6.58 wt. percent nitrogen. The product thought to have been secured would have been composed of 83.67 wt. percent carbon, 9.83 wt. percent hydrogen and 6.50 wt. percent nitrogen. The infra-red spectrum indicated the absence of amine hydrogens and the NMR spectrum exhibited a doublet at 0.90 p.p.m. corresponding to the C–9 methyl group, a singlet at 7.25 p.p.m. belonging to the C–5 phenyl group and a multiplet at 3.20 p.p.m. due to the hydrogens located alpha to the nitrogen atom. On the basis of the experimental data the following structure was assigned to the amine product secured.

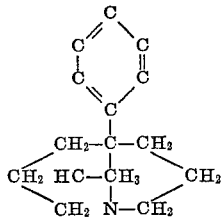

The above bicyclic amine was found to be insoluble in water and soluble in ketones, alcohols, and aromatic and chlorinated hydrocarbons.

Example 9

To 50 milliliters (ml.) of anhydrous methanol was added 15.3 grams (g.) (0.1 mole) of 1-aza-5,9-dimethyl-bicyclo[3,3,1]nonane. To this solution was added dropwise and with constant stirring 14.2 g. (0.1 mole) of methyl iodide. During methyl iodide addition the temperature of the reaction mixture was maintained between 20 and 28° C. with an ice-water bath. After the addition was completed, the reaction mixture was permitted to stand for 1 hour at room temperature and the solvent was removed under vacuum. Approximately 29 g. of the solid quaternary ammonium iodide of the bicyclic amine was obtained. This solid was found to be soluble in water and alcohols but in-soluble in hydrocarbon solvents and further was found to decompose without melting when heated above 330° C.

Example 10

Fifteen milliliters (ml.) of t-butyl alcohol was mixed with 7.7 grams (g.) (0.05 mole) of 1-aza-5,9-dimethyl-bicyclo[3,3,1]nonane and 1 ml. of distilled water. The resultant solution was heated to 35° C. and 5 ml. of propylene oxide was added dropwise with constant stirring over a 30 minute period during which time the temperature of the solution was maintained at 35° C. The reaction mixture was permitted to stand overnight in a nitrogen atmosphere. The solution of the quaternary choline type base was viscous and exhibited strongly basic characteristics.

Having thus described the general nature and specific embodiments of the present invention, the true scope of the invention is now pointed out in the appended claims.

What is claimed is:

1. A process for the preparation of bicyclic amine compositions which comprises reacting a compound selected from the group consisting of materials having the general formula:

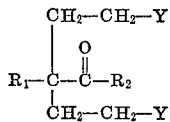

and

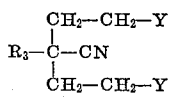

wherein Y is selected from the group consisting of nitrile and methyl amino radicals, $R_1$ is a monovalent organic radical having from 2 to 20 carbon atoms, $R_2$ is selected from the group consisting of aryl, alkyl substituted aryl, and heterogroup substituted aryl radicals having from 6 to 25 carbon atoms and $R_3$ is an organic radical having from 2 to 25 carbon atoms with hydrogen in the presence of a hydrogenation catalyst while heating at elevated temperatures in a stepwise manner for a time sufficient to secure said bicyclic amine compositions.

2. A process of claim 1 wherein said hydrogenation reaction is conducted in the presence of a solvent.

3. A process of claim 1 wherein $R_1$ is selected from the group consisting of monovalent alkyl, alkenyl, aryl, alkylaryl, aralkyl, heterogroup substituted aryl and ether radicals.

4. A process of claim 3 wherein $R_3$ is selected from the group consisting of monovalent aryl radicals, alkylaryl radicals, heterogroup substituted aryl radicals, ethylidene radicals and substituted ethylidene radicals.

5. The process of claim 4 wherein said reaction is conducted by heating in a stepwise manner at temperatures varying between about 100° to 260° C. and at a hydrogen pressure varying between about 900 to 3000 p.s.i.g.

6. The process for the preparation of bicyclic amine compositions which comprises reacting a compound having the formula selected from the group consisting of

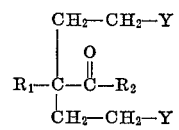

and

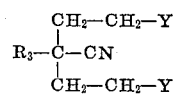

wherein Y is selected from the group consisting of nitrile and methyl amino radicals, $R_1$ is selected from the group consisting of monovalent aryl radicals having from 6 to 25 carbon atoms and alkyl radicals having from 2 to 15 carbon atoms, $R_2$ is an aryl radical having from 6 to 25 carbon atoms and $R_3$ is selected from the group consisting of alkylaryl radicals having from 7 to 25 carbon atoms and aryl radicals, with hydrogen in the presence of a hydrogenation catalyst while heating in a stepwise manner at elevated temperatures for a time sufficient to secure said bicyclic amine compound as the predominant product, said reaction being conducted in the presence of a solvent.

7. The process of claim 6 wherein said heating is conducted in a stepwise manner at temperatures of from about 100° to about 130° C. for 1 to 4 hours and then from about 160° C. to about 260° C. for 1 to 10 hours and at hydrogen pressures varying between 1600 and 23000 p.s.i.g.

8. The process of claim 7 wherein said hydrogenation catalyst is Raney nickel.

9. The process of claim 7 wherein said solvent is selected from the group consisting of p-dioxane, t-butyl alcohol, tetrahydrofuran and ethanol.

10. The process of claim 7 wherein $R_1$ is an aryl radical having from 6 to 25 carbon atoms.

11. The process of claim 7 wherein said reaction is carried out initially over a Raney cobalt catalyst for the primary heating period and thereafter continued over a combined Raney cobalt/Raney nickel catalyst for the secondary heating period.

References Cited

UNITED STATES PATENTS 3,467,660   9/1969   Beitchman _____ 260—293

FOREIGN PATENTS 668,372   8/1964   Belgium.

OTHER REFERENCES

Badger et al., J. Chem. Soc. 1949, 1141–4.
Paden et al., J. Am. Chem. Soc. 58, 2487–99 (1936).

HENRY R. JILES, Primary Examiner

G. T. TODD, Assistant Examiner

U.S. Cl. X.R.

71—74; 252—50; 260—290 H, 293.53, 293.87, 296 R; 424—263, 267